July 31, 1934.  R. J. COCHRAN  1,968,745
DEMOUNTABLE WHEEL
Filed Aug. 12, 1933  3 Sheets-Sheet 1

R.J.Cochran Inventor

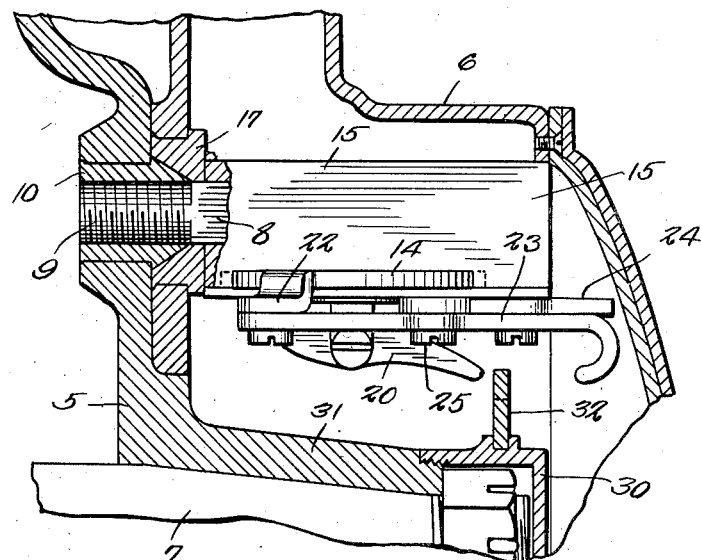
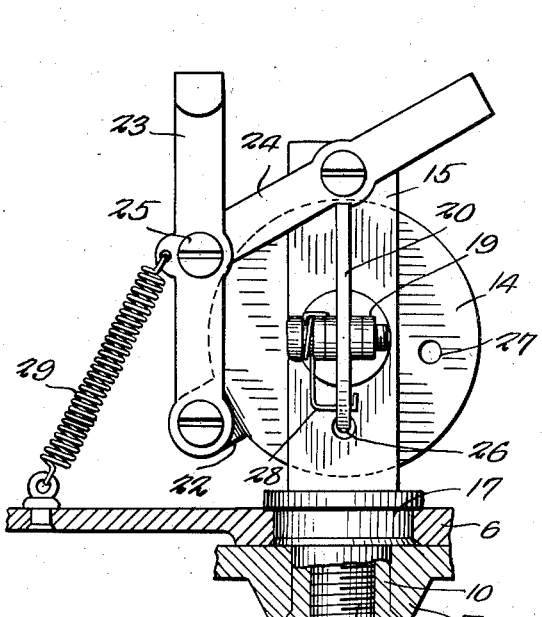
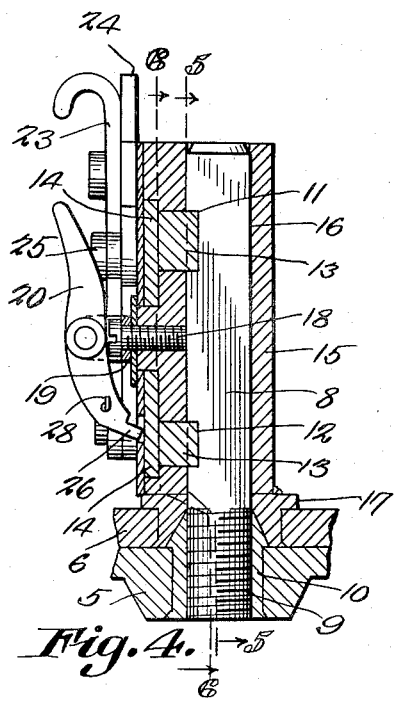

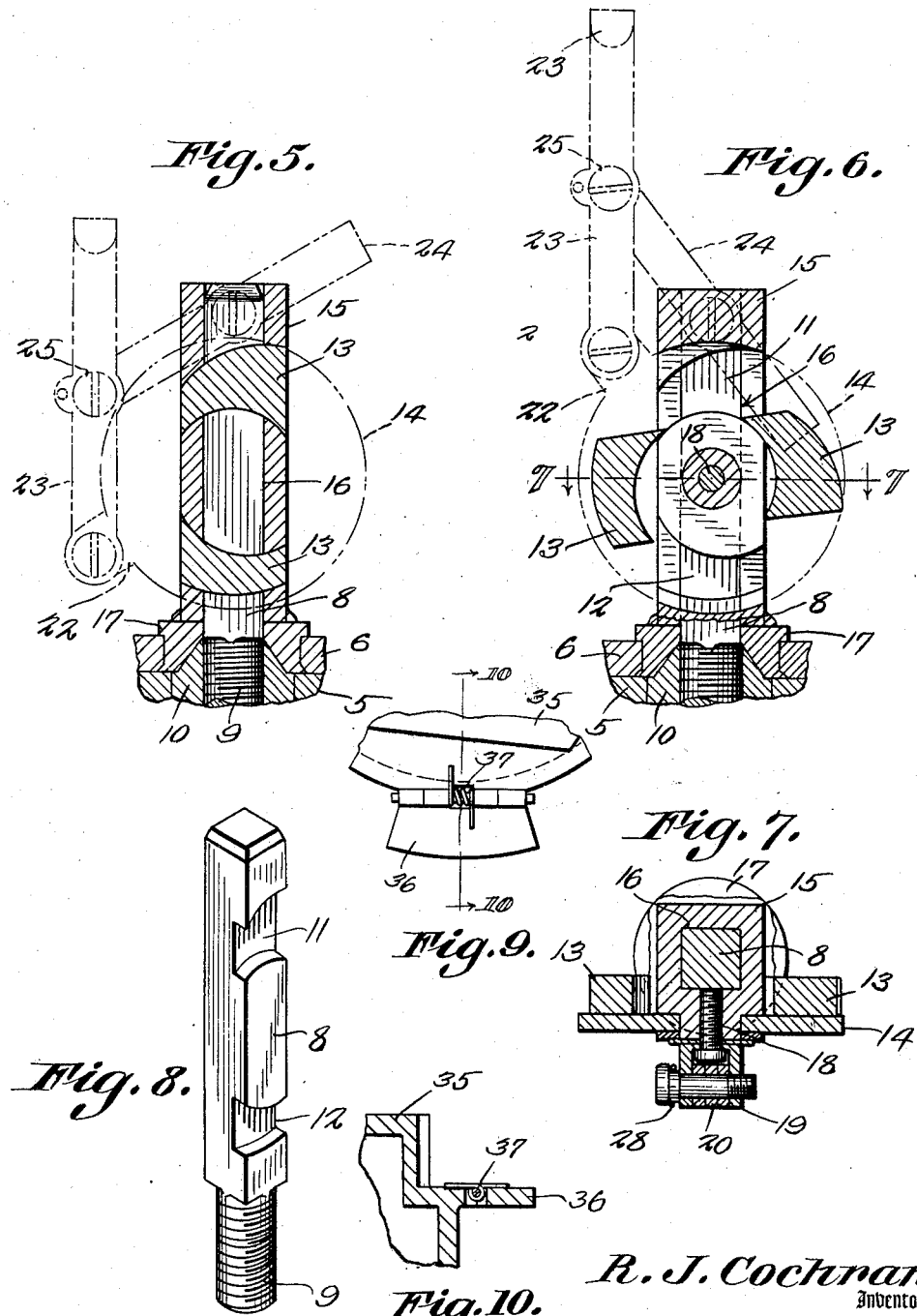

Patented July 31, 1934

1,968,745

UNITED STATES PATENT OFFICE 1,968,745

DEMOUNTABLE WHEEL

Robert Jasper Cochran, Woodward, Okla., assignor of one-half to Ed. Hamblin, Jr., Woodward, Okla.

Application August 12, 1933, Serial No. 684,899

5 Claims. (Cl. 301—9)

This invention relates to motor vehicle wheels, the primary object of the invention being to provide means for securing a motor vehicle wheel to its hub, in such a way that the wheel may be readily and easily removed or replaced.

An important object of the invention is to provide securing means of this character including studs, and means carried by the wheel and cooperating with the studs, locking the hub to the wheel section.

A still further object of the invention is to provide means in the form of levers, for operating the pivoted members of the securing mechanism, thereby eliminating the use of bolts and nuts, commonly employed in securing wheels to their hubs, and which may only be removed or replaced with the use of a wrench.

With the foregoing and other objects in view, which will appear as the description proceeds, the invention resides in the combination and arrangement of parts and in the details of construction hereinafter described and claimed, it being understood that changes in the precise embodiment of the invention herein disclosed may be made within the scope of what is claimed, without departing from the spirit of the invention.

Referring to the drawings:

Figure 2 is a fragmental sectional view through a wheel section mounted on its hub section.

Figure 3 is an elevational view illustrating the wheel securing mechanism in its active position.

Figure 4 is a longitudinal sectional view through one of the securing members.

Figure 5 is a sectional view taken on line 5—5 of Figure 4.

Figure 6 is a sectional view taken on line 6—6 of Figure 4.

Figure 7 is a sectional view taken on line 7—7 of Figure 6.

Figure 8 is a perspective view of one of the studs carried by the wheel hub.

Figure 9 is a fragmental plan view of a modified form of dust cap.

Figure 10 is a sectional view taken on line 10—10 of Figure 9.

Figure 1:
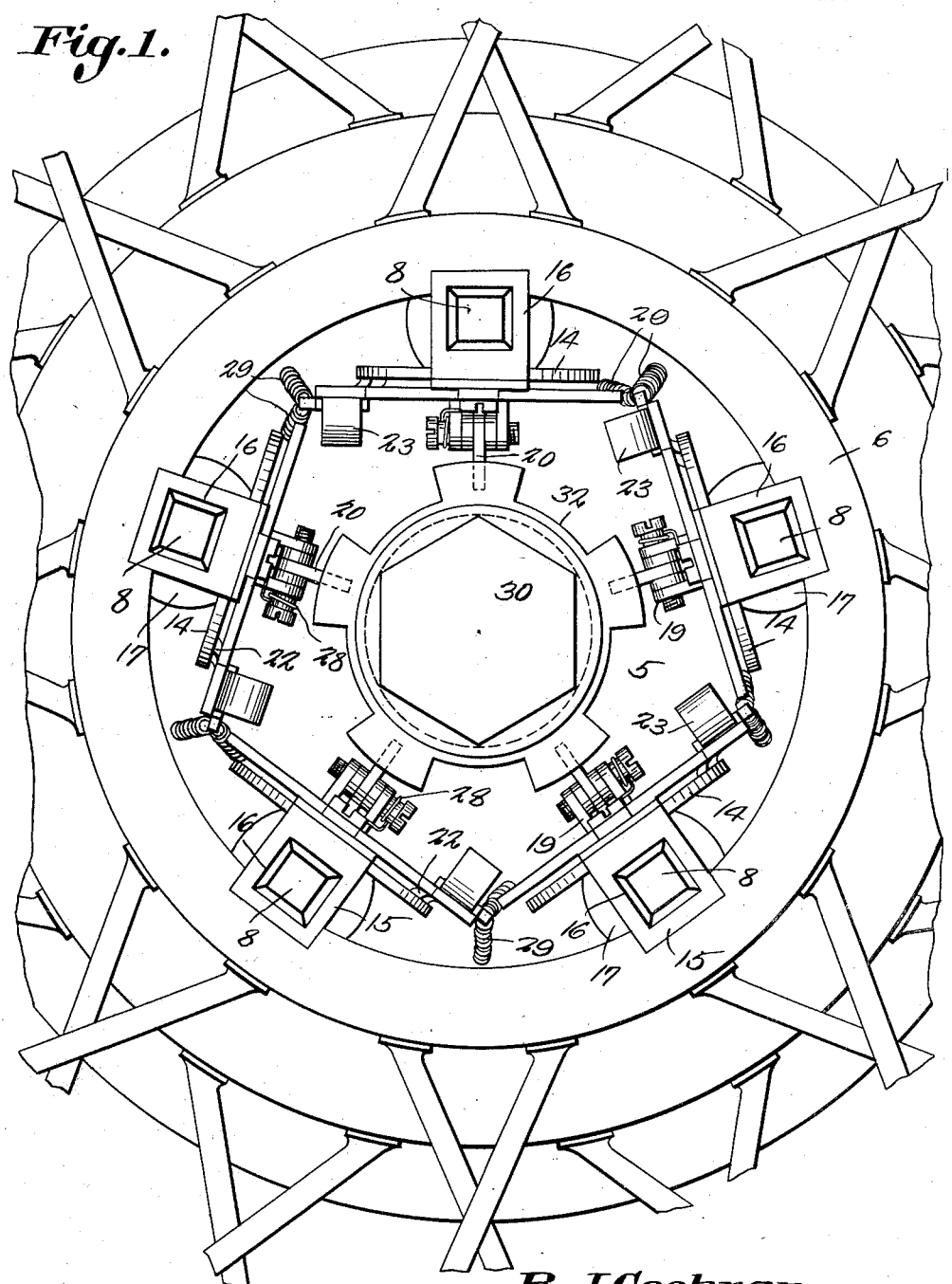
Figure 1 is a plan view of a wheel section, showing the same as mounted on its hub section, that in turn is mounted on the vehicle axle.

Referring to the drawings in detail, the wheel embodies a hub section 5 and a wheel section 6, the hub section being shown as mounted on the axle 7 of a motor vehicle.

Extending from the hub section are studs 8, the studs having threaded portions 9 fitted in threaded bushings 10, that are secured in openings of the hub section, as clearly shown by Figure 2 of the drawings. These studs 8 are formed with curved cut out portions 11 and 12 respectively, the cut out portions being designed to accommodate the lugs 13, formed on the locking disks 14.

These locking disks 14 are pivotally mounted on the housings 15, that are carried by the wheel section 6, the housings being formed with cut out portions accommodating the lugs 13. Each of these housings is formed with a longitudinal bore 16, square to accommodate the stud 8 associated therewith, the stud being square in cross section. The ends of the housings are open, so that when the wheel is positioned over the hub, the studs will pass into the housings, where they will be locked.

The wheel is formed with openings to receive the bushings 17, which are secured to the housings, the bushings 17 being provided with tapered openings to fit over the tapered ends of the threaded bushings 10, thereby insuring a close fit between the wheel section and hub section.

Each of these locking disks 14 is mounted on its housing 15 by means of the pin 18, which pin provides a support for the substantially U-shaped bearing member 19 that provides a support for the locking lever 20, associated therewith.

Extending from each locking disk is an ear 22, to which the pull-link 23 is connected, the free end of the lever being formed into a hook or finger piece 24, to be engaged by the finger of the operator, in actuating the disk, to release the stud associated therewith.

Pivotally mounted on each housing 15, is a lever 24 that has pivotal connection with the pull-link 23 at 25, the free end of the lever 24 being disposed so that it may be readily struck by a tool such as a hammer or the like, in order to release the locking disk, should it become wedged or secured against movement by rust.

As clearly shown by the drawings, the levers 20 of the several locking devices carried by the hub have inwardly extended ends 26, that are adapted to engage in the openings 27 of the locking disks, securing the disks against movement, after they have been moved to positions to release the studs associated therewith.

These levers 20 are normally urged towards the locking disks, by means of the coiled springs 28.

Springs 29 connect with the pull-links 23, and have their opposite ends anchored to the inner surface of the wheel section, with the result that the levers and locking disks are normally held in their active positions, locking the studs within the housings.

In order to release or demount a wheel, it is necessary to pull the pull-links 23, rotating the locking disks from positions as shown by Figure 5 of the drawings, to positions as shown by Figure 6 of the drawings. When these pull-links 23 have been moved to the positions releasing the studs, the locking levers 20 move into the openings 27, securing the locking disks in their inactive positions, permitting the wheel section to be removed.

In order that a wheel may be positioned with facility, a cap 30 is provided, that fits over the threaded end 31 of the wheel hub, the cap 30 carrying the disk 32, formed with peripheral cut out portions providing clearances so that the disk 32 may be moved to bring the cut out portions opposite to the levers 20, permitting the levers to pass the disk 32, as the wheel is being removed.

On positioning the wheel, the locking levers 20 are in their locked positions, and when the wheel section is positioned over the hub section, the levers 20 contact with the disk 32, which has been moved to bring the cut out portions thereof out of alignment with the pull-links 23.

As the locking levers 20 engage the disk 32, the levers 20 are moved to disengage the locking disks, allowing the springs 29 to move the locking disks bringing the lugs 13 thereof to positions within the cut out portions of the studs, securely locking the wheel section to the hub section.

In the form of the dust cap as shown by Figures 9 and 10 of the drawings, the dust cap is indicated by the reference character 35, and is provided with hinged members 36, that are normally urged to their active position by means of coiled springs 37.

It is obvious that when the wheel is positioned, the locking levers 20 will move over these members 36, causing the locking levers to move to their inactive positions, and permitting the locking mechanism of the wheel to operate.

When the wheel is removed, the locking levers contact with the members 36, swinging them upwardly or out of the paths of travel of the locking levers, and permitting free removal of the wheel.

Having thus described the invention what is claimed is:

1. A demountable wheel comprising a hub section and a wheel section, studs extending from the hub section, housings mounted on the wheel section and adapted to accommodate the studs, means carried by the housings and cooperating with the studs for securing the wheel section to the hub section, levers adapted to lock the securing means in an inactive position, and means for operating the levers, releasing the levers, when the wheel section is positioned over the hub section.

2. A demountable wheel comprising a hub section and a wheel section, studs extending from the hub section, housings mounted on the wheel section and into which the studs extend, means carried by the housings and engaging the studs for locking the studs within the housings, means for normally holding the stud locking means in their active positions, and means for automatically holding the locking means in an inactive position.

3. A demountable wheel comprising a hub section and a wheel section, studs extending from the hub section, housings extending from the wheel section, and adapted to receive the studs, said studs having cut out portions in the inner faces thereof, movable lugs mounted on the housings and engaging within the cut out portions of the studs, securing the sections of the wheel together.

4. A demountable wheel comprising a hub section and a wheel section, studs extending from the hub section and having cut out portions, housings secured to the wheel section and into which the studs extend when the sections are assembled, movable disks secured to the housings, lugs on the disks and adapted to engage within the cut out portions, locking the sections of the wheel together, and means for securing the disks in their active positions.

5. A demountable wheel comprising a hub section and a wheel section, studs extending from the hub section, housings carried by the wheel section, disks mounted on the housings, lugs on the disks and extending into the housings, said lugs cooperating with the studs in securing the sections of the wheel together, means for normally urging the disks in one direction, and means for automatically releasing the disks.

ROBERT JASPER COCHRAN.